United States Patent
Izaki et al.

(10) Patent No.: US 9,453,953 B2
(45) Date of Patent: Sep. 27, 2016

(54) THIN POLARIZING FILM, OPTICAL LAMINATE WITH THIN POLARIZING FILM, AND PRODUCTION METHOD FOR THIN POLARIZING FILM

(71) Applicant: NITTO DENKO CORPORATION, Ibaraki-shi, Osaka (JP)

(72) Inventors: Akinori Izaki, Ibaraki (JP); Takeharu Kitagawa, Ibaraki (JP); Shusaku Goto, Ibaraki (JP); Takashi Kamijo, Ibaraki (JP); Tomohiro Mori, Ibaraki (JP); Minoru Miyatake, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 14/920,322

(22) Filed: Oct. 22, 2015

(65) Prior Publication Data
US 2016/0047960 A1    Feb. 18, 2016

Related U.S. Application Data

(62) Division of application No. 13/813,049, filed as application No. PCT/JP2011/069991 on Sep. 2, 2011, now Pat. No. 9,227,222.

(30) Foreign Application Priority Data

Sep. 3, 2010  (JP) .................................. 2010-198220
May 31, 2011  (JP) .................................. 2011-121281

(51) Int. Cl.
*G02B 5/30*  (2006.01)
*B29C 55/02*  (2006.01)
(Continued)

(52) U.S. Cl.
CPC ................. *G02B 5/305* (2013.01); *B05D 5/06* (2013.01); *B29C 55/026* (2013.01); *B29C 55/06* (2013.01);
(Continued)

(58) Field of Classification Search
CPC .................................................... G02B 5/3033
See application file for complete search history.

(56) References Cited

U.S. PATENT DOCUMENTS 6,606,136 B2    8/2003   Matsumoto et al.
7,110,177 B2    9/2006   Sugino et al.
(Continued)

FOREIGN PATENT DOCUMENTS

CN    1629660 A     6/2005
CN    101371172 A   2/2009
(Continued)

OTHER PUBLICATIONS

International Search Report for PCT/JP2011/069991 (corresponding to U.S. Appl. No. 13/813,409), mailing date of Oct. 11, 2011.
(Continued)

*Primary Examiner* — Joseph P Martinez
(74) *Attorney, Agent, or Firm* — Westerman, Hattori, Daniels & Adrian, LLP

(57) ABSTRACT

The present invention provides a thin polarizing film which has only a small environmental load and has excellent optical characteristics.
The thin polarizing film is produced by forming a polyvinyl alcohol-based resin layer on a thermoplastic resin substrate. The thin polarizing film has a thickness of 10 μm or less, a single axis transmittance of 42.0% or more, a polarization degree of 99.95% or more, and an iodine content of 17.6 grams per 400×700 square millimeters or less, which is measured by an ion chromatography method.

6 Claims, 4 Drawing Sheets

(51) Int. Cl.
*B29C 55/06* (2006.01)
*B05D 5/06* (2006.01)
*C08J 7/04* (2006.01)
*B29D 11/00* (2006.01)
*B29K 29/00* (2006.01)
*G02F 1/1335* (2006.01)
*B29K 67/00* (2006.01)

(52) U.S. Cl.
CPC .......... *B29D 11/00644* (2013.01); *C08J 7/047* (2013.01); *G02B 5/3033* (2013.01); *B29K 2029/04* (2013.01); *B29K 2067/003* (2013.01); *B29K 2995/0034* (2013.01); *C08J 2323/20* (2013.01); *C08J 2367/02* (2013.01); *C08J 2429/04* (2013.01); *G02F 1/133528* (2013.01)

(56) References Cited

U.S. PATENT DOCUMENTS

| | | |
|---|---|---|
| 7,651,643 B2 | 1/2010 | Saiki et al. |
| 8,314,987 B2 | 11/2012 | Goto et al. |
| 8,320,042 B2 | 11/2012 | Goto et al. |
| 8,323,538 B2 | 12/2012 | Ogomi et al. |
| RE44,315 E | 6/2013 | Sugino et al. |
| 8,559,105 B2 | 10/2013 | Yoshimi et al. |
| 2002/0063243 A1 | 5/2002 | Matsumoto et al. |
| 2003/0137732 A1 | 7/2003 | Sugino et al. |
| 2005/0243245 A1 | 11/2005 | Taguchi et al. |
| 2006/0177606 A1 | 8/2006 | Lo et al. |
| 2006/0227423 A1 | 10/2006 | Saiki et al. |
| 2008/0003444 A1 | 1/2008 | Oya |
| 2009/0051058 A1 | 2/2009 | Ogomi et al. |
| 2009/0122237 A1 | 5/2009 | Fukagawa et al. |
| 2009/0317567 A1 | 12/2009 | Takeda et al. |
| 2010/0066948 A1 | 3/2010 | Hisakado et al. |
| 2010/0085641 A1 | 4/2010 | Saiki et al. |
| 2010/0157426 A1 | 6/2010 | Matsunami et al. |
| 2010/0165262 A1 | 7/2010 | Nagase et al. |
| 2010/0202051 A1 | 8/2010 | Yoshimi et al. |
| 2011/0205628 A1 | 8/2011 | Yasen et al. |
| 2012/0055607 A1 | 3/2012 | Kitagawa et al. |
| 2012/0055608 A1 | 3/2012 | Kitagawa et al. |
| 2012/0055621 A1 | 3/2012 | Kitagawa et al. |
| 2012/0055622 A1 | 3/2012 | Kitagawa et al. |
| 2012/0055623 A1 | 3/2012 | Kitagawa et al. |
| 2012/0056211 A1 | 3/2012 | Kitagawa et al. |
| 2012/0056340 A1 | 3/2012 | Kitagawa et al. |
| 2012/0057104 A1 | 3/2012 | Kitagawa et al. |
| 2012/0057107 A1 | 3/2012 | Kitagawa et al. |
| 2012/0057231 A1 | 3/2012 | Goto et al. |
| 2012/0057232 A1 | 3/2012 | Goto et al. |
| 2012/0058291 A1 | 3/2012 | Kitagawa et al. |
| 2012/0058321 A1 | 3/2012 | Goto et al. |

FOREIGN PATENT DOCUMENTS

| | | | |
|---|---|---|---|
| CN | 101486268 A | 7/2009 | |
| JP | 51-069644 A | 6/1976 | |
| JP | 57-124701 A | 8/1982 | |
| JP | 1-227103 A | 9/1989 | |
| JP | 10288709 A | 10/1998 | |
| JP | 2000-338329 A | 12/2000 | |
| JP | 2001-91739 A | 4/2001 | |
| JP | 2001-091740 A | 4/2001 | |
| JP | 2001-91740 A | 4/2001 | |
| JP | 2001-343521 A | 12/2001 | |
| JP | 2001-343522 A | 12/2001 | |
| JP | 2001-350021 | * 12/2001 | ............... G02B 5/30 |
| JP | 2001-350021 A | 12/2001 | |
| JP | 2002-169024 A | 6/2002 | |
| JP | 2002-350638 A | 12/2002 | |
| JP | 2003-043257 A | 2/2003 | |
| JP | 2003-43257 A | 2/2003 | |
| JP | 2003-279748 A | 10/2003 | |
| JP | 2004-020633 A | 1/2004 | |
| JP | 2004-20830 A | 1/2004 | |
| JP | 2004-37880 A | 2/2004 | |
| JP | 2004-341503 A | 12/2004 | |
| JP | 2005-84313 A | 3/2005 | |
| JP | 2005-266325 A | 9/2005 | |
| JP | 2005-284246 A | 10/2005 | |
| JP | 2005-331909 A | 12/2005 | |
| JP | 2006-215523 A | 8/2006 | |
| JP | 2006-276236 A | 10/2006 | |
| JP | 2007-017845 A | 1/2007 | |
| JP | 2008-15000 A | 1/2008 | |
| JP | 2008-281761 A | 11/2008 | |
| JP | 2009-098653 A | 5/2009 | |
| JP | 4279944 B2 | 6/2009 | |
| JP | 2009-237124 A | 10/2009 | |
| JP | 2009-258411 A | 11/2009 | |
| JP | 2010-128206 A | 6/2010 | |
| JP | 4751481 B1 | 8/2011 | |
| JP | 2011-227450 A | 11/2011 | |
| TW | 200617444 A | 6/2006 | |
| WO | 2010/071093 A1 | 6/2010 | |

OTHER PUBLICATIONS

Japanese Office Action dated Jul. 9, 2014, issued in Japanese Patent Application No. 2011-190953 (corresponding to U.S. Appl. No. 13/813,409), w/English translation (9 pages).
Chinese Office Action dated Jul. 1, 2014, issued in Chinese Patent Application No. 201180041701.4 (corresponding to U.S. Appl. No. 13/813,409), w/English translation (14 pages).
International Search Report for PCT/JP2011/070438 (corresponding to U.S. Appl. No. 13/814,117), mailing date of Dec. 6, 2011.
Office Action dated Aug. 5, 2014, issued in U.S. Appl. No. 13/814,117 (16 pages).
Office Action dated Aug. 11, 2014, issued in U.S. Appl. No. 13/813,049 (13 pages).
U.S. Office Action dated Dec. 3, 2014, issued in U.S. Appl. No. 13/814,117 (19 pages).
U.S. Office Action dated Mar. 16, 2015, issued in U.S. Appl. No. 13/813,049 (30 pages).
Office Action dated Apr. 22, 2015, issued in Japanese Patent Application No. 2011-195540 (counterpart of U.S. Appl. No. 13/814,177), with English translation (18 pages).
Notice of Allowance dated Jul. 22, 2015, issued in U.S. Appl. No. 13/813,049 (7 pages).
Notification of Reasons for Refusal dated Oct. 28, 2015, issued in counterpart Japanese Patent Application No. 2014-249515, w/English translation (12 pages).
Third Party Observation dated Feb. 29, 2016, filed in counterpart Japanese Patent Application No. 2014-249515, with English translation. (26 pages).
Third Party Observation dated Jul. 13, 2016, against counterpart European Patent Application: EP2613183A1 (14 pages).

* cited by examiner (a)

(b)

(a)

(b)

THIN POLARIZING FILM, OPTICAL LAMINATE WITH THIN POLARIZING FILM, AND PRODUCTION METHOD FOR THIN POLARIZING FILM

CROSS-REFERENCE TO RELATED APPLICATION

The application is a Divisional of U.S. patent application Ser. No. 13/813,049, filed on Jan. 29, 2013, which is a National Stage of International Application No. PCT/JP2011/069991, filed on Sep. 2, 2011, which claims the benefit of priority from the prior Japanese Patent Application No. 2010-198220, filed on Sep. 3, 2010 and Japanese Patent Application No. 2011-121281, filed on May 31, 2011, the entire contents of which are incorporated herein by reference.

TECHNICAL FIELD

The present invention relates to a thin polarizing film, an optical laminate having a thin polarizing film, and a method of producing a thin polarizing film.

BACKGROUND ART

An optical laminate having a polarizing film is placed on each of both sides of a liquid crystal cell of a liquid crystal display apparatus as a representative image display apparatus, the placement being attributable to an image-forming mode of the apparatus. The optical laminate representatively has a polarizing film obtained by causing a polyvinyl alcohol (PVA)-based film to adsorb a dichromatic substance and uniaxially stretching the film, and a protective film placed on each of both sides of the polarizing film. The polarizing film obtained by uniaxially stretching the PVA-based film representatively has a thickness of several tens of micrometers.

Meanwhile, in association with a worldwide increase in environmental awareness in recent years, an industrial product having only a small environmental load has been demanded in every field. For example, in the European Union, evaluation, application, and registration of impacts of chemical substances contained in industrial products on human health and the global environment (REACH) are required for the sake of human health and environmental protection, and boric acid, which is contained in the polarizing film, is a candidate substance to be subject thereto. Further, boric acid has a flame retardant function. Accordingly, when a boric acid content of the polarizing film is high, incineration efficiency during an incineration treatment of the optical laminate having the polarizing film which has become industrial waste is low, resulting in a large environmental load. Also in thermal recycling, which involves recovering thermal energy generated during incineration, when the boric acid content of the polarizing film is high, recycling efficiency is low. In addition, iodine is frequently used as the dichromatic substance to be adsorbed onto the polarizing film. However, when an iodine content of the polarizing film is high, a pale purple gas is discharged from a chimney of an incinerator during the incineration treatment, which makes neighborhood residents uneasy.

Thinning the polarizing film as means for solving the problems as described above inevitably reduces the boric acid content and iodine content of the polarizing film. The following method has been proposed as a method of stably producing a thin polarizing film (see Patent Literatures 1 to 3). A laminate of a thermoplastic resin substrate and a PVA-based resin layer is subjected to in-air stretching, and is then immersed in a dyeing liquid so that the thin polarizing film may be obtained. However, such method involves a problem in that optical characteristics (such as polarization degree and single axis transmittance) of the thin polarizing film to be obtained are insufficient.

CITATION LIST

Patent Literature

[PTL 1] JP 2001-343521 A
[PTL 2] JP 4279944 B2
[PTL 3] JP 51-069644 A

SUMMARY OF INVENTION

Technical Problem

The present invention has been made in order to solve the conventional problems, and a main object of the present invention is to provide a thin polarizing film which has only a small environmental load and has excellent optical characteristics.

Means for Solving the Problems

According to one aspect of the present invention, a thin polarizing film is provided. The thin polarizing film is produced by forming a polyvinyl alcohol-based resin layer on a thermoplastic resin substrate. The thin polarizing film has a thickness of 10 μm or less, a single axis transmittance of 42.0% or more, a polarization degree of 99.95% or more, and an iodine content of 17.6 grams per 400×700 square millimeters or less, which is measured by an ion chromatography method.

In one embodiment of the invention, the thin polarizing film has a boric acid content of 1.5 grams per 400×700 square millimeters or less.

According to another aspect of the invention, a method of producing the thin polarizing film is provided. The method of producing a thin polarizing film includes forming a polyvinyl alcohol-based resin layer on a thermoplastic resin substrate to prepare a laminate, dyeing the polyvinyl alcohol-based resin layer with iodine and subjecting the laminate to underwater stretching in an aqueous solution of boric acid.

In one embodiment of the invention, a maximum stretching ratio of the laminate is 5.0 times or more.

In another embodiment of the invention, the method of producing the thin polarizing film further includes subjecting the laminate to in-air stretching at 95° C. or more before the dyeing and the boric acid underwater stretching.

Advantageous Effects of Invention

According to the present invention, the underwater stretching (boric acid underwater stretching) is performed through the use of the aqueous solution of boric acid, thereby allowing the laminate having formed therein the PVA-based resin layer to be stretched at a high ratio and in a favorable manner. As a result, a thin polarizing film extremely excellent in optical characteristics can be produced. In addition, the thin polarizing film to be obtained has extremely low iodine and boric acid contents, and hence its environmental load can be favorably suppressed.

DESCRIPTION OF EMBODIMENTS

Hereinafter, preferred embodiments of the present invention are described. However, the present invention is not limited to these embodiments.

A. Production Method

A method of producing a thin polarizing film of the present invention includes: forming a PVA-based resin layer on a thermoplastic resin substrate to prepare a laminate (step A); dyeing the PVA-based resin layer with iodine (step B); and subjecting the laminate to underwater stretching in an aqueous solution of boric acid (step C). Hereinafter, the respective steps are described.

A-1. Step A

Figure 1:
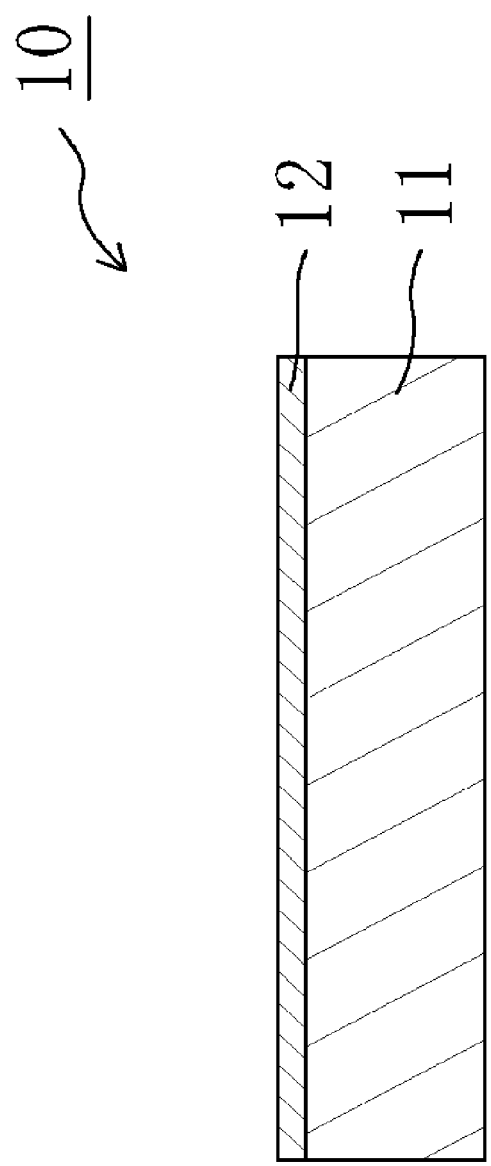
FIG. 1 is a schematic sectional view of a laminate according to a preferred embodiment of the present invention.

FIG. 1 is a schematic sectional view of a laminate according to a preferred embodiment of the present invention. A laminate 10 has a thermoplastic resin substrate 11 and a PVA-based resin layer 12, and is prepared by forming the PVA-based resin layer 12 on the thermoplastic resin substrate 11. Any appropriate method can be adopted as a method of forming the PVA-based resin layer 12. The PVA-based resin layer 12 is preferably formed by applying an application liquid containing a PVA-based resin onto the thermoplastic resin substrate 11 and drying the liquid.

Any appropriate material can be adopted as a constituent material for the thermoplastic resin substrate. In one embodiment, amorphous (uncrystallized) polyethylene terephthalate-based resins are each preferably used as the constituent material for the thermoplastic resin substrate. Of those, a noncrystalline (hard-to-crystallize) polyethylene terephthalate-based resin is particularly preferably used. Specific examples of the noncrystalline polyethylene terephthalate-based resin include a copolymer further containing isophthalic acid as a dicarboxylic acid and a copolymer further containing cyclohexane dimethanol as a glycol.

The thermoplastic resin substrate absorbs water in the step C to be described later and the water serves a plastic function so that the substrate can plasticize. As a result, a stretching stress can be significantly reduced. Accordingly, the stretching can be performed at a high ratio and the stretchability of the thermoplastic resin substrate can be more excellent than that at the time of in-air stretching. As a result, a thin polarizing film having excellent optical characteristics (such as polarization degree) can be produced. The percentage of water absorption of the thermoplastic resin substrate is preferably 0.2% or more, more preferably 0.3% or more. Meanwhile, the percentage of water absorption of the thermoplastic resin substrate is preferably 3.0% or less, more preferably 1.0% or less. The use of such thermoplastic resin substrate can prevent, for example, the following inconvenience. The dimensional stability of the thermoplastic resin substrate remarkably reduces at the time of the production and hence the external appearance of the thin polarizing film to be obtained deteriorates. In addition, the use can prevent the rupture of the substrate at the time of the underwater stretching and the release of the PVA-based resin layer from the thermoplastic resin substrate. It should be noted that the percentage of water absorption is a value determined in conformity with JIS K 7209.

The glass transition temperature (Tg) of the thermoplastic resin substrate is preferably 170° C. or less. The use of such thermoplastic resin substrate can sufficiently secure the stretchability of the laminate while suppressing the crystallization of the PVA-based resin layer. Further, the glass transition temperature is more preferably 120° C. or less in consideration of the plasticization of the thermoplastic resin substrate by water and favorable performance of the underwater stretching. In one embodiment, the glass transition temperature of the thermoplastic resin substrate is preferably 60° C. or more. The use of such thermoplastic resin substrate prevents an inconvenience such as the deformation of the thermoplastic resin substrate (e.g., the occurrence of unevenness, a slack, or a wrinkle) during the application and drying of the application liquid containing the PVA-based resin, thereby enabling favorable production of the laminate. In addition, the use enables favorable stretching of the PVA-based resin layer at a suitable temperature (e.g., about 60° C.) The glass transition temperature of the thermoplastic resin substrate can be adjusted by, for example, introducing a denaturation group into the constituent material or heating the substrate constituted of a crystallization material. It should be noted that the glass transition temperature (Tg) is a value determined in conformity with JIS K 7121.

In another embodiment, a glass transition temperature lower than 60° C. is permitted as long as the thermoplastic resin substrate does not deform during the application and drying of the application liquid containing the PVA-based resin. In this case, examples of the constituent material for the thermoplastic resin substrate include olefin-based resins such as a polypropylene and a polymethylpentene.

The thickness of the thermoplastic resin substrate before the stretching is preferably 20 μm to 300 μm, more preferably 50 μm to 200 μm. When the thickness is less than 20 μm, it may be difficult to form the PVA-based resin layer. When the thickness exceeds 300 μm, in, for example, the step B, it may take a long time for the thermoplastic resin substrate to absorb water, and an excessively large load may be needed in the stretching.

Any appropriate resin can be adopted as the PVA-based resin. Examples of the resin include a polyvinyl alcohol and an ethylene-vinyl alcohol copolymer. The polyvinyl alcohol is obtained by saponifying a polyvinyl acetate. The ethylene-vinyl alcohol copolymer is obtained by saponifying an ethylene-vinyl acetate copolymer. The saponification degree of the PVA-based resin is typically 85 mol % to 100 mol %, preferably 95.0 mol % to 99.95 mol %, more preferably 99.0 mol % to 99.93 mol %. The saponification degree can be determined in conformity with JIS K 6726-1994. The use of the PVA-based resin having such saponification degree can provide a thin polarizing film excellent in durability. When the saponification degree is excessively high, the resin may gel.

The average polymerization degree of the PVA-based resin can be appropriately selected depending on purposes. The average polymerization degree is typically 1,000 to 10,000, preferably 1,200 to 4,500, more preferably 1,500 to 4,300. It should be noted that the average polymerization degree can be determined in conformity with JIS K 6726-1994.

The application liquid is representatively a solution prepared by dissolving the PVA-based resin in a solvent. Examples of the solvent include water, dimethylsulfoxide, dimethylformamide, dimethylacetamide, N-methylpyrrolidone, various glycols, polyhydric alcohols such as trimethylolpropane, and amines such as ethylenediamine and diethylenetriamine. One kind of those solvents can be used alone, or two or more kinds thereof can be used in combination. Of those, water is preferred. The concentration of the PVA-based resin of the solution is preferably 3 parts by weight to 20 parts by weight with respect to 100 parts by weight of the solvent. At such resin concentration, a uniform coating film in close contact with the thermoplastic resin substrate can be formed.

The application liquid may be compounded with an additive. Examples of the additive include a plasticizer and a surfactant. Examples of the plasticizer include polyhydric alcohols such as ethylene glycol and glycerin. Examples of the surfactant include nonionic surfactants. Such additive can be used for the purpose of additionally improving the uniformity, dyeing property, or stretchability of the PVA-based resin layer to be obtained.

Any appropriate method can be adopted as a method of applying the application liquid. Examples of the method include a roll coating method, a spin coating method, a wire bar coating method, a dip coating method, a die coating method, a curtain coating method, a spray coating method, and a knife coating method (comma coating method or the like).

The application liquid is preferably applied and dried at a temperature of 50° C. or more.

The thickness of the PVA-based resin layer before the stretching is preferably 20 μm or less. On the other hand, the thickness before the stretching is preferably 2 μm or more, more preferably 4 μm or more. When the thickness is excessively small, the optical characteristics of a thin polarizing film to be obtained may be lowered.

The thermoplastic resin substrate may be subjected to a surface treatment (such as a corona treatment) before the formation of the PVA-based resin layer. Alternatively, an easy-adhesion layer may be formed on the thermoplastic resin substrate. Performing such treatment can improve adhesiveness between the thermoplastic resin substrate and the PVA-based resin layer.

A-2. Step B

In the step B, the PVA-based resin layer is dyed with iodine. Specifically, the dyeing is performed by causing the PVA-based resin layer to adsorb iodine. A method for the adsorption is, for example, a method involving immersing the PVA-based resin layer (laminate) in a dyeing liquid containing iodine, a method involving applying the dyeing liquid to the PVA-based resin layer, or a method involving spraying the dyeing liquid on the PVA-based resin layer. Of those, the method involving immersing the laminate in the dyeing liquid is preferred. This is because iodine can favorably adsorb to the layer.

The dyeing liquid is preferably an aqueous solution of iodine. The compounding amount of iodine is preferably 0.1 part by weight to 0.5 part by weight with respect to 100 parts by weight of water. The aqueous solution of iodine is preferably compounded with an iodide in order that the solubility of iodine in water may be increased. Examples of the iodide include potassium iodide, lithium iodide, sodium iodide, zinc iodide, aluminum iodide, lead iodide, copper iodide, barium iodide, calcium iodide, tin iodide, and titanium iodide. Of those, potassium iodide is preferred. The compounding amount of the iodide is preferably 0.02 part by weight to 20 parts by weight, more preferably 0.1 part by weight to 10 parts by weight with respect to 100 parts by weight of water. The liquid temperature of the dyeing liquid at the time of the dyeing is preferably 20° C. to 50° C. in order that the dissolution of the PVA-based resin may be suppressed. When the PVA-based resin layer is immersed in the dyeing liquid, an immersion time is preferably 5 seconds to 5 minutes in order that the transmittance of the PVA-based resin layer may be secured. In addition, the dyeing conditions (the concentration, the liquid temperature, and the immersion time) can be set so that the polarization degree or single axis transmittance of the polarizing film to be finally obtained may fall within a predetermined range. In one embodiment, the immersion time is set so that the polarization degree of the polarizing film to be obtained may be 99.98% or more. In another embodiment, the immersion time is set so that the single axis transmittance of the polarizing film to be obtained may be 40% to 44%.

The step B is preferably performed before the step C to be described later.

A-3. Step C

In the step C, the laminate is subjected to underwater stretching (boric acid underwater stretching). According to the underwater stretching, the stretching can be performed at a temperature lower than the glass transition temperature (representatively about 80° C.) of each of the thermoplastic resin substrate and the PVA-based resin layer, and hence the PVA-based resin layer can be stretched at a high ratio while its crystallization is suppressed. As a result, a thin polarizing film having excellent optical characteristics (such as polarization degree) can be produced.

Any appropriate method may be adopted as a method of stretching the laminate. Specifically, fixed-end stretching may be adopted, or free-end stretching (such as a method involving passing the laminate between rolls having different peripheral speeds to uniaxially stretch the laminate) may be adopted. The stretching of the laminate may be performed in one stage, or may be performed in a plurality of stages. When the stretching is performed in a plurality of stages, a stretching ratio to be described later is the product of stretching ratios in the respective stages.

The underwater stretching is preferably performed by immersing the laminate in an aqueous solution of boric acid (boric acid underwater stretching). The use of the aqueous solution of boric acid as a stretching bath can impart, to the PVA-based resin layer, rigidity enough to withstand a tension to be applied at the time of the stretching and such water resistance that the layer does not dissolve in water. Specifically, boric acid can produce a tetrahydroxyborate anion in the aqueous solution to cross-link with the PVA-based resin through a hydrogen bond. As a result, the PVA-based resin layer can be favorably stretched with the aid of the rigidity and the water resistance imparted thereto, and hence a thin polarizing film having excellent optical characteristics (such as polarization degree) can be produced.

The aqueous solution of boric acid is preferably obtained by dissolving boric acid and/or a borate in water as a solvent. The concentration of boric acid is preferably 1 part by weight to 10 parts by weight with respect to 100 parts by weight of water. Setting the concentration of boric acid to 1 part by weight or more can effectively suppress the dissolution of the PVA-based resin layer, thereby enabling the production of a thin polarizing film having additionally high characteristics. It should be noted that an aqueous solution obtained by dissolving a boron compound such as borax, glyoxal, glutaric aldehyde, or the like as well as boric acid or the borate in the solvent may also be used.

When the PVA-based resin layer has been caused to adsorb iodine in advance through the dyeing step (step B), the stretching bath (aqueous solution of boric acid) is preferably compounded with an iodide. Compounding the bath with the iodide can suppress the elution of iodine which the PVA-based resin layer has been caused to adsorb. Specific examples of the iodide are as described above. The concentration of the iodide is preferably 0.05 part by weight to 15 parts by weight, more preferably 0.5 part by weight to 8 parts by weight with respect to 100 parts by weight of water.

A stretching temperature (liquid temperature of stretching bath) in the step C is preferably 40° C. to 85° C., more preferably 50° C. to 85° C. At such temperature, the PVA-based resin layer can be stretched at a high ratio while its dissolution is suppressed. In one embodiment, as described above, the glass transition temperature (Tg) of the thermoplastic resin substrate is preferably 60° C. or more in relation to the formation of the PVA-based resin layer. In this case, when the stretching temperature falls short of 40° C., there is a risk that the stretching cannot be favorably performed even in consideration of the plasticization of the thermoplastic resin substrate by water. On the other hand, as the temperature of the stretching bath increases, the solubility of the PVA-based resin layer is raised and hence excellent optical characteristics may not be obtained. The laminate is preferably immersed in the stretching bath for a time of 15 seconds to 5 minutes.

When the underwater stretching (boric acid underwater stretching) is adopted, the stretching can be performed at a high ratio, and hence a thin polarizing film having excellent optical characteristics (such as polarization degree) can be produced. Specifically, a maximum stretching ratio is preferably 5.0 times or more with respect to the original length of the laminate. The term "maximum stretching ratio" as used in the description refers to a stretching ratio immediately before the rupture of the laminate. The stretching ratio at which the laminate ruptures is separately identified and a value lower than the value by 0.2 is the maximum stretching ratio.

A-4. Any Other Step

The method of producing a thin polarizing film according to the present invention may include any other step except the step A, the step B, and the step C. Examples of the other step include an insolubilizing step, a cross-linking step, the stretching step different from the step C, a washing step, and a drying (moisture content adjusting) step. The other step may be performed at any appropriate timing.

The insolubilizing step is representatively performed by immersing the PVA-based resin layer in an aqueous solution of boric acid. Water resistance can be imparted to the PVA-based resin layer by subjecting the layer to an insolubilizing treatment. The concentration of the aqueous solution of boric acid is preferably 1 part by weight to 4 parts by weight with respect to 100 parts by weight of water. The liquid temperature of an insolubilizing bath (the aqueous solution of boric acid) is preferably 20° C. to 50° C. The insolubilizing step is preferably performed after the preparation of the laminate and before the step B or the step C.

The cross-linking step is representatively performed by immersing the PVA-based resin layer in an aqueous solution of boric acid. Water resistance can be imparted to the PVA-based resin layer by subjecting the layer to a cross-linking treatment. The concentration of the aqueous solution of boric acid is preferably 1 part by weight to 4 parts by weight with respect to 100 parts by weight of water. In addition, when the cross-linking step is performed after the dyeing step, the solution is preferably further compounded with an iodide. Compounding the solution with the iodide can suppress the elution of iodine which the PVA-based resin layer has been caused to adsorb. The compounding amount of the iodide is preferably 1 part by weight to 5 parts by weight with respect to 100 parts by weight of water. Specific examples of the iodide are as described above. The liquid temperature of a cross-linking bath (the aqueous solution of boric acid) is preferably 20° C. to 50° C. The cross-linking step is preferably performed before the step C. In a preferred embodiment, the step B, the cross-linking step, and the step C are performed in the stated order.

The stretching step different from the step C is, for example, a step of subjecting the laminate to in-air stretching at a high temperature (e.g., 95° C. or more). Such in-air stretching step is preferably performed before the boric acid underwater stretching (step C) and the dyeing step. Such in-air stretching step is hereinafter referred to as "preliminary in-air stretching" because the step can be ranked as stretching preliminary or auxiliary to the boric acid underwater stretching.

When the preliminary in-air stretching is combined with the boric acid underwater stretching, the laminate can be stretched at an additionally high ratio in some cases. As a result, a thin polarizing film having additionally excellent optical characteristics (such as a polarization degree) can be produced. For example, when a polyethylene terephthalate-based resin is used as the thermoplastic resin substrate, the thermoplastic resin substrate can be stretched favorably, while its orientation is suppressed, by a combination of the preliminary in-air stretching and the boric acid underwater stretching than that in the case of the boric acid underwater stretching alone. As the orientation property of the thermoplastic resin substrate is raised, its stretching tension increases and hence it becomes difficult to stably stretch the substrate or the thermoplastic resin substrate ruptures. Accordingly, the laminate can be stretched at an additionally high ratio by stretching the thermoplastic resin substrate while suppressing its orientation.

In addition, when the preliminary in-air stretching is combined with the boric acid underwater stretching, the orientation property of the PVA-based resin is improved and hence the orientation property of the PVA-based resin can be improved even after the boric acid underwater stretching. Specifically, the orientation property of the PVA-based resin is improved in advance by the preliminary in-air stretching so that the PVA-based resin may easily cross-link with boric acid during the boric acid underwater stretching. Then, the stretching is performed in a state where boric acid serves as a junction, and hence the orientation property of the PVA-based resin is assumed to be high even after the boric acid underwater stretching. As a result, a thin polarizing film having excellent optical characteristics (such as a polarization degree) can be produced.

As with the step C, a stretching method for the preliminary in-air stretching may be fixed-end stretching, or may be free-end stretching (such as a method involving passing the laminate between rolls having different peripheral speeds to uniaxially stretch the laminate). In addition, the stretching may be performed in one stage, or may be performed in a plurality of stages. When the stretching is performed in a plurality of stages, a stretching ratio to be described later is the product of stretching ratios in the respective stages. It is preferred that a stretching direction in the step be substantially the same as the stretching direction in the step C.

The stretching ratio in the preliminary in-air stretching is preferably 3.5 times or less. A stretching temperature in the preliminary in-air stretching is preferably equal to or higher than the glass transition temperature of the PVA-based resin. The stretching temperature is preferably 95° C. to 150° C. It should be noted that the maximum stretching ratio when the preliminary in-air stretching and the boric acid underwater stretching are combined with each other is preferably 5.0 times or more, more preferably 5.5 times or more, still more preferably 6.0 times or more with respect to the original length of the laminate.

The washing step is representatively performed by immersing the PVA-based resin layer in an aqueous solution of potassium iodide. A drying temperature in the drying step is preferably 30° C. to 100° C.

Figure 2:
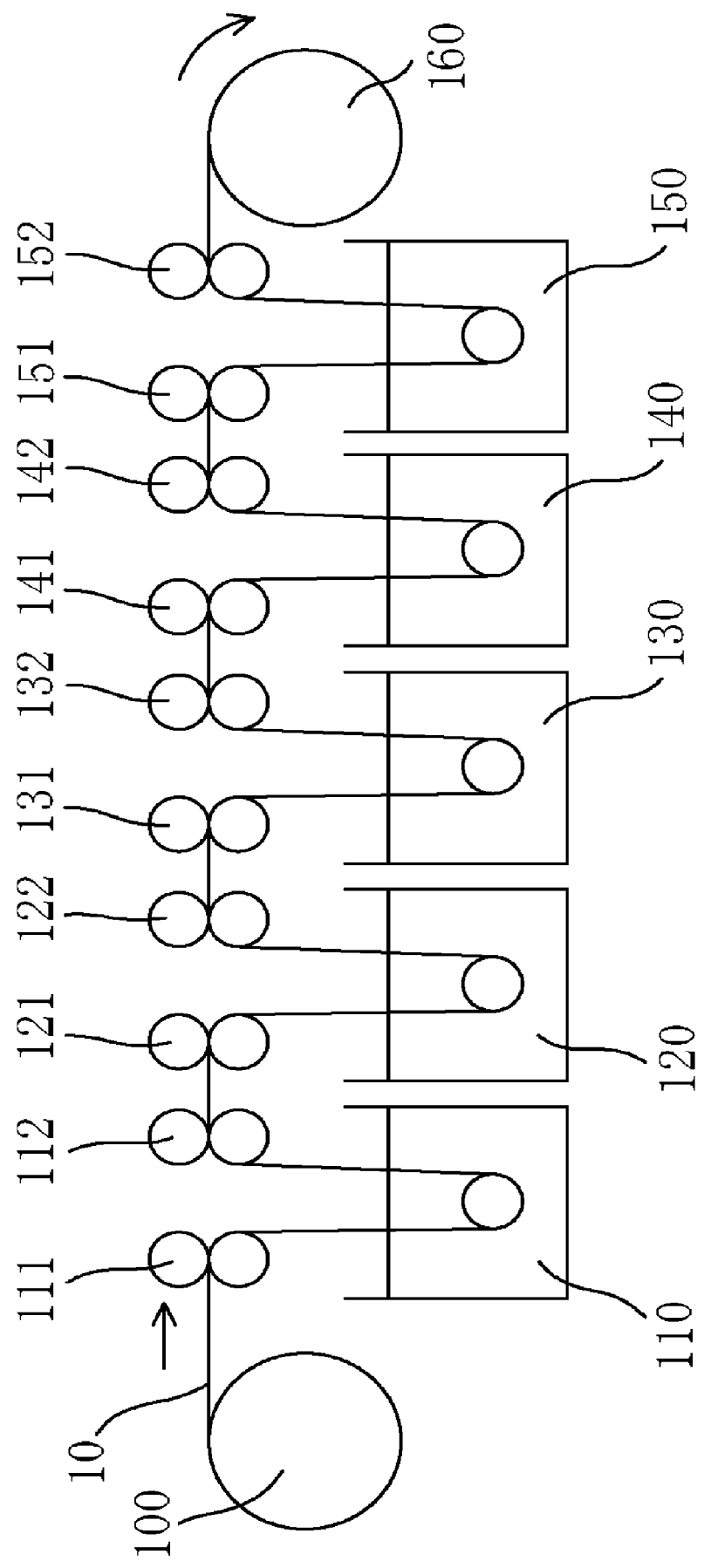
FIG. 2 is a schematic view illustrating an example of a method of producing a thin polarizing film of the present invention.

FIG. 2 is a schematic view illustrating an example of the method of producing a thin polarizing film of the present invention. The laminate 10 is fed from a feeding portion 100, and is then immersed in a bath 110 of an aqueous solution of boric acid by rolls 111 and 112 (the insolubilizing step). After that, the laminate is immersed in a bath 120 of an aqueous solution of iodine and potassium iodide by rolls 121 and 122 (the step B). Next, the laminate is immersed in a bath 130 of an aqueous solution of boric acid and potassium iodide by rolls 131 and 132 (the cross-linking step). After that, the laminate 10 is stretched through the application of a tension in its longitudinal direction (lengthwise direction) with rolls 141 and 142 having different speed ratios while being immersed in a bath 140 of an aqueous solution of boric acid (the step C). The laminate 10 subjected to the stretching treatment is immersed in a bath 150 of an aqueous solution of potassium iodide by rolls 151 and 152 (the washing step), and is then subjected to the drying step (not shown). After that, the laminate is wound by a winding portion 160.

B. Thin Polarizing Film

A thin polarizing film of the present invention is obtained by the production method. The thin polarizing film of the present invention is substantially a PVA-based resin film that adsorbs and orients a dichromatic substance. The thickness of the thin polarizing film is preferably 10 μm or less, more preferably 7.5 μm or less, still more preferably 5 μm or less. Meanwhile, the thickness of the thin polarizing film is preferably 0.5 μm or more, more preferably 1.5 μm or more. When the thickness is excessively small, the optical characteristics of a thin polarizing film to be obtained may be lowered. The thin polarizing film preferably shows absorption dichroism at any wavelength in the wavelength range of 380 nm to 780 nm. The single axis transmittance of the thin polarizing film is preferably 40.0% or more, more preferably 41.0% or more, still more preferably 42.0% or more. The polarization degree of the thin polarizing film is preferably 99.8% or more, more preferably 99.9% or more, still more preferably 99.95% or more.

The iodine content of the thin polarizing film of the present invention is preferably 3.3 kcps or less, more preferably 3.2 kcps or less. On the other hand, the iodine content of the thin polarizing film per unit thickness is preferably 0.30 kcps/μm or more. The iodine content is a value obtained by measuring the intensity of a fluorescent X-ray spectrum through fluorescent X-ray analysis. Specifically, the iodine content can be quantified based on the resultant spectral intensity and the intensity of a standard sample. Representatively used is a fundamental parameter method (FP method), which involves determining a theoretical X-ray intensity from a theoretical expression for a fluorescent X-ray intensity with physical constants such as a mass absorption coefficient, a fluorescence yield, and the spectral distribution of a X-ray source, and comparing the theoretical X-ray intensity to a measured X-ray intensity, thereby calculating a content ratio.

The iodine content of the thin polarizing film may be quantified by, for example, titration or an ion chromatography method as well as the foregoing. For example, the iodine content may be quantified by subjecting a trap liquid in which a gas generated through combustion of the thin polarizing film is trapped to measurement with an ion chromatograph. In this case, the iodine content of the thin polarizing film is preferably 17.6 grams per 400×700 square millimeters or less, more preferably 15 grams per 400×700 square millimeters or less, still more preferably 13 grams per 400×700 square millimeters or less. On the other hand, the iodine content of the thin polarizing film is preferably 2 grams per 400×700 square millimeters or more, more preferably 4 grams per 400×700 square millimeters or more.

The boric acid content of the thin polarizing film is preferably 1.5 grams per 400×700 square millimeters or less. The boric acid content is a value measured by dissolving the thin polarizing film to provide a solution and subjecting the solution to neutralization titration with an aqueous solution of NaOH. It should be noted that, except the foregoing, for example, the boric acid content may be quantified based on an absorption peak attributed to boric acid by an FT-IR ATR method.

According to the present invention, while excellent optical characteristics are achieved as described above, such extreme reductions in iodine and boric acid contents can be achieved, and hence an environmental load can be favorably suppressed.

Any appropriate method can be adopted as a usage of the thin polarizing film. Specifically, the thin polarizing film may be used in a state of being integrated with the thermoplastic resin substrate, or may be used after having been transferred from the thermoplastic resin substrate onto any other member.

C. Optical Laminate

Figure 3:
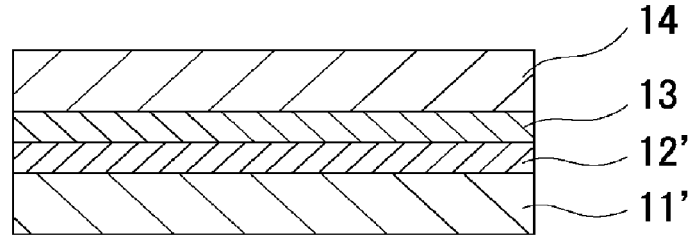
FIGS. 3a & b are each a schematic sectional view of an optical film laminate according to a preferred embodiment of the present invention.
Figure 3:
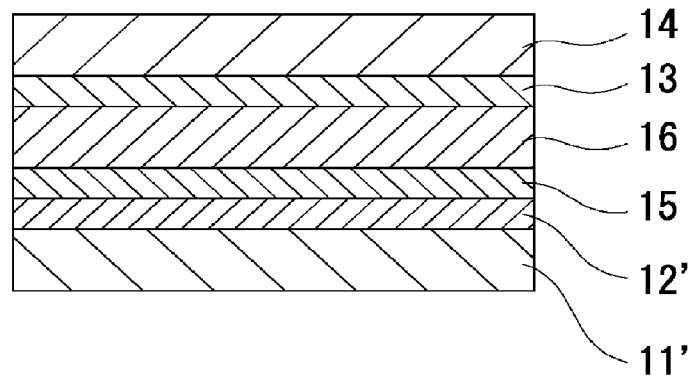

An optical laminate of the present invention has the thin polarizing film. FIGS. 3A and 3B are each a schematic sectional view of an optical film laminate according to a preferred embodiment of the present invention. An optical film laminate 100 has a thermoplastic resin substrate 11', a thin polarizing film 12', a pressure-sensitive adhesive layer 13, and a separator 14 in the stated order. An optical film laminate 200 has the thermoplastic resin substrate 11', the thin polarizing film 12', an adhesive layer 15, an optical functional film 16, the pressure-sensitive adhesive layer 13, and the separator 14 in the stated order. In this embodiment, the thermoplastic resin substrate is directly used as an optical member without being released from the resultant thin polarizing film 12'. The thermoplastic resin substrate 11' can function as, for example, a protective film for the thin polarizing film 12'.

Figure 4:
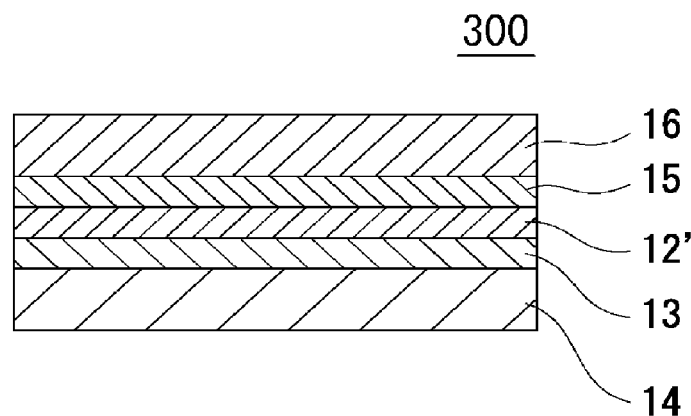
FIGS. 4a & b are each a schematic sectional view of an optical functional film laminate according to another preferred embodiment of the present invention.
Figure 4:
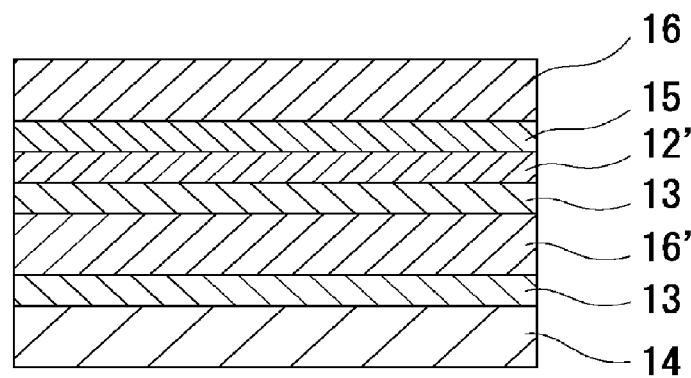

FIGS. 4A and 4B are each a schematic sectional view of an optical functional film laminate according to another preferred embodiment of the present invention. An optical functional film laminate 300 has the separator 14, the pressure-sensitive adhesive layer 13, the thin polarizing film 12', the adhesive layer 15, and the optical functional film 16 in the stated order. An optical functional film laminate 400 has, in addition to the construction of the optical functional film laminate 300, a second optical functional film 16' provided between the thin polarizing film 12' and the separator 14 through the pressure-sensitive adhesive layer 13. In this embodiment, the thermoplastic resin substrate has been removed.

The lamination of the respective layers constructing the optical laminate of the present invention is not limited to the illustrated examples, and any appropriate pressure-sensitive adhesive layer or adhesive layer is used. The pressure-sensitive adhesive layer is representatively formed of an acrylic pressure-sensitive adhesive. The adhesive layer is representatively formed of a vinyl alcohol-based adhesive. The optical functional film can function as, for example, a protective film for a polarizing film or a retardation film.

EXAMPLES

Hereinafter, the present invention is specifically described by way of examples. However, the present invention is not limited by these examples. It should be noted that methods of measuring the respective characteristics are as described below.

1. Thickness

Measurement was performed with a digital micrometer (manufactured by Anritsu Corporation, product name: "KC-351C").

2. Percentage of Water Absorption of Thermoplastic Resin Substrate

Measurement was performed in conformity with JIS K 7209.

3. Glass Transition Temperature (Tg) of Thermoplastic Resin Substrate

Measurement was performed in conformity with JIS K 7121.

Example 1

Step A

An amorphous polyethylene terephthalate (A-PET) film (manufactured by Mitsubishi Plastics, Inc., trade name "NOVACLEAR," thickness: 100 μm) having a percentage of water absorption of 0.60% and a glass transition temperature (Tg) of 80° C. was used as a thermoplastic resin substrate.

An aqueous solution of a polyvinyl alcohol (PVA) resin (manufactured by The Nippon Synthetic Chemical Industry Co., Ltd., trade name "Gohsenol (trademark) NH-26") having a polymerization degree of 2,600 and a saponification degree of 99.9% was applied onto one surface of the thermoplastic resin substrate and dried at 60° C. so that a PVA-based resin layer having a thickness of 7 μm was formed. Thus, a laminate was prepared.

The resultant laminate was immersed in an insolubilizing bath having a liquid temperature of 30° C. (an aqueous solution of boric acid obtained by compounding 100 parts by weight of water with 3 parts by weight of boric acid) for 30 seconds (insolubilizing step).

Next, the laminate was immersed in a dyeing bath having a liquid temperature of 30° C. (an aqueous solution of iodine obtained by compounding 100 parts by weight of water with 0.1 part by weight of iodine and 0.7 part by weight of potassium iodide) so that the single axis transmittance (Ts) of a thin polarizing film to be finally obtained was 40 to 44% (step B).

Next, the laminate was immersed in a cross-linking bath having a liquid temperature of 30° C. (an aqueous solution of boric acid obtained by compounding 100 parts by weight of water with 3 parts by weight of potassium iodide and 3 parts by weight of boric acid) for 60 seconds (cross-linking step).

After that, the laminate was uniaxially stretched in its longitudinal direction (lengthwise direction) between rolls having different peripheral speeds while being immersed in an aqueous solution of boric acid having a liquid temperature of 60° C. (an aqueous solution obtained by compounding 100 parts by weight of water with 4 parts by weight of boric acid and 5 parts by weight of potassium iodide) (step C). The laminate was immersed in the aqueous solution of boric acid for a time of 120 seconds, and was stretched immediately before its rupture. The maximum stretching ratio was 5.0 times.

After that, the laminate was immersed in a washing bath (an aqueous solution obtained by compounding 100 parts by weight of water with 3 parts by weight of potassium iodide), and was then dried with warm air at 60° C. (washing and drying step).

Thus, an optical film laminate in which a thin polarizing film having a thickness of 3 μm was formed on the thermoplastic resin substrate was obtained.

Example 2

A thin polarizing film was obtained in the same manner as in Example 1 except that a polymethylpentene film (manufactured by Mitsui Chemicals, Inc., trade name "TPX," thickness: 100 μm) having a Tg of 30° C. was used as a thermoplastic resin substrate.

The maximum stretching ratio in the step C was 5.5 times, and the thickness of the resultant thin polarizing film was 3 μm.

Example 3

A thin polarizing film was obtained in the same manner as in Example 1 except that in the preparation of the laminate, the PVA-based resin layer was formed so that its thickness was 10 μm.

The maximum stretching ratio in the step C was 5.0 times, and the thickness of the resultant thin polarizing film was 5 μm.

Example 4

A laminate prepared in the same manner as in Example 1 except that a PVA-based resin layer having a thickness of 10 μm was formed was uniaxially stretched in its longitudinal direction (lengthwise direction) at 2.0 times in an oven at 110° C. between rolls having different peripheral speeds (preliminary in-air stretching step). After that, the insolubilizing step, the step B, the cross-linking step, the step C, and the washing and drying step were performed in the same manner as in Example 1. Thus, a thin polarizing film was obtained.

In the step C, the total stretching ratio (maximum stretching ratio) including that of the preliminary in-air stretching was 6.5 times, and the thickness of the resultant thin polarizing film was 5 μm.

Example 5

A laminate prepared in the same manner as in Example 1 except that a PVA-based resin layer having a thickness of 6 μm was formed was uniaxially stretched in its longitudinal direction (lengthwise direction) at 2.0 times in an oven at 110° C. between rolls having different peripheral speeds (preliminary in-air stretching step). After that, the insolubilizing step, the step B, the cross-linking step, the step C, and the washing and drying step were performed in the same manner as in Example 1. Thus, a thin polarizing film was obtained.

In the step C, the total stretching ratio (maximum stretching ratio) including that of the preliminary in-air stretching was 6.5 times, and the thickness of the resultant thin polarizing film was 2.5 lam.

Comparative Example 1

A polymer film (manufactured by Kuraray Co., Ltd., trade name "VF-PS#7500") having a thickness of 75 μm and containing a PVA-based resin as a main component was immersed sequentially in five baths under the following conditions (1) to (5) while a tension was applied to the film in its longitudinal direction, and was stretched so that the final stretching ratio was 6.2 times with respect to the original length of the film. The stretched film was dried for 1 minute in an air circulation type dry oven at 40° C. Thus, a polarizing film having a thickness of 30 μm was produced.

<Conditions>

(1) Swelling bath: Pure water at 30° C.

(2) Dyeing bath: Aqueous solution at 30° C. containing 0.032 part by weight of iodine and 0.2 part by weight of potassium iodide with respect to 100 parts by weight of water (3) First cross-linking bath: Aqueous solution at 40° C. containing 3% by weight of potassium iodide and 3% by weight of boric acid (4) Second cross-linking bath: Aqueous solution at 60° C. containing 5% by weight of potassium iodide and 4% by weight of boric acid (5) Washing bath: Aqueous solution at 25° C. containing 3% by weight of potassium iodide.

Comparative Example 2

A polarizing film was produced in the same manner as in Comparative Example 1 except that a polymer film having a thickness of 60 μm and containing a PVA-based resin as a main component was used. The thickness of the resultant polarizing film was 22 μm.

Comparative Example 3

A polarizing film was produced in the same manner as in Comparative Example 1 except that a polymer film having a thickness of 40 μm and containing a PVA-based resin as a main component was used. The thickness of the resultant polarizing film was 17 μm.

Comparative Example 4

A laminate prepared in the same manner as in Example 1 was subjected to in-air stretching (longitudinal uniaxial stretching) in an oven at 110° C. immediately before the laminate ruptured. The maximum stretching ratio in this case was 4.0 times.

After that, the dyeing step, the cross-linking step, and the washing and drying step were performed in the stated order in the same manner as in Example 1. Thus, a thin polarizing film was obtained. The thickness of the resultant thin polarizing film was 4 μm.

Comparative Example 5

A laminate prepared in the same manner as in Example 1 was subjected to the dyeing step performed in the same manner as in Example 1, and was then dried with warm air at 60° C.

After that, the laminate was subjected to in-air stretching (longitudinal uniaxial stretching) in an oven at 90° C. immediately before its rupture. The maximum stretching ratio in this case was 4.5 times, and the thickness of the resultant thin polarizing film was 4 μm.

The polarization degree of each of the resultant polarizing films was measured. A method of measuring the polarization degree is as described below. Table 1 shows the results of the measurement.

(Method of Measuring Polarization Degree)

The single axis transmittance (Ts), parallel transmittance (Tp), and crossed transmittance (Tc) of each polarizing film were measured with an ultraviolet-visible spectrophotometer (manufactured by JASCO Corporation, product name "V7100"), and then its polarization degree (P) was determined from the following equation.

$$\text{Polarization degree } (P) \text{ (\%)} = \{(Tp-Tc)/(Tp+Tc)\}^{1/2} \times 100$$

It should be noted that the Ts, the Tp, and the Tc are Y values measured with the two-degree field of view (C light source) of JIS Z 8701 and subjected to visibility correction.

The iodine and iodine compound contents of each of the resultant polarizing films were quantified by measuring the intensity of a fluorescent X-ray spectrum. Conditions for the measurement are as described below. Table 1 shows the results of the measurement.

Analysis device: fluorescent X-ray analyzer (XRF) manufactured by Rigaku Corporation, product name "ZSX100e"

Measurement sample: circular sample having a diameter of 10 mm

Anticathode: rhodium

Dispersive crystal: lithium fluoride

Excitation light energy: 40 kV-90 mA

Iodine measurement line: I-LA

Quantification method: FP method $2\theta$ angle peak: 103.078 degrees (iodine), 136.847 degrees (potassium)

Measurement time: 40 seconds

The iodine and iodine compound contents of each of the resultant polarizing films were measured with an ion chromatograph by the following procedure.

A test piece having dimensions of 400 mm×700 mm was cut out of the resultant polarizing film, and the weight of the test piece was measured. After that, the test piece was combusted with an automated sample combustion system (manufactured by Mitsubishi Chemical Analytech Co., Ltd., product name: AQF-100) to generate a gas, whichwas trapped in 10 ml of an absorbent liquid. The resultant trap liquid was adjusted to a volume of 15 ml, and diluted 100-fold with pure water. After that, the dilution was injected into the ion chromatograph for measurement. Conditions for the measurement are as described below. Table 1 shows the results of the measurement.

Analysis device: manufactured by DIONEX, product name "DX-320"

Separation column: Ion Pac AS11

Guard column: Ion Pac AS11

Removal system: ASRS-300

Detector: electric conductivity detector

Eluent: aqueous solution of KOH

Eluent flow rate: 1.2 ml/min

Sample injection amount: 250 μl

The boric acid content of the resultant polarizing film was measured by the following procedure.

A test piece having dimensions of 400 mm×700 mm was cut out of each of the resultant polarizing films. The weight of the cut-out test piece was measured, and the entirety of the test piece was then dissolved in 1 L of warm water. An appropriate amount of the solution was collected and subjected to neutralization titration with a 1 mol/L aqueous solution of NaOH to measure a boric acid concentration (wt %).

The boric acid content (grams per 400×700 square millimeters) was calculated by multiplying the resultant boric acid concentration (wt %) by the weight of the test piece. Table 1 shows the results.

TABLE 1

|  | Thickness μm | Single axis transmittance % | Polarization degree % | Iodine | | Boric acid grams per 400 × 700 square millimeters |
|---|---|---|---|---|---|---|
|  |  |  |  | kcps | grams per 400 × 700 square millimeters |  |
| Example 1 | 3 | 42.2 | 99.98 | 2.0 | 10.9 | 0.3 |
| Example 2 | 3 | 42.1 | 99.99 | 1.7 | 9.4 | 0.4 |
| Example 3 | 5 | 42.3 | 99.99 | 2.1 | 11.5 | 0.5 |
| Example 4 | 5 | 42.6 | 99.99 | 1.9 | 10.4 | 0.6 |
| Example 5 | 2.5 | 43.9 | 99.96 | 1.0 | 6.0 | 0.3 |
| Comparative Example 1 | 30 | 42.2 | 99.99 | 3.5 | 18.6 | 3.5 |
| Comparative Example 2 | 22 | 42.1 | 99.99 | 3.0 | 16.1 | 2.5 |
| Comparative Example 3 | 17 | 42.3 | 99.99 | 2.7 | 14.5 | 2.0 |
| Comparative Example 4 | 4 | 42.1 | 99.57 | 1.5 | 8.4 | 0.2 |
| Comparative Example 5 | 4 | 42.0 | 97.18 | 1.9 | 10.4 | 0.3 |

The thin polarizing film of each of Examples 1 to 5 had extremely small iodine and boric acid contents, and was extremely excellent in optical characteristics as well.

INDUSTRIAL APPLICABILITY

The thin polarizing film of the present invention has higher polarization performance than a conventional thin polarizing film. Thus, according to the present invention, the thin polarizing film can be applied to a liquid crystal panel of a liquid crystal television, a liquid crystal display, a mobile phone, a digital camera, a video camera, a handheld game console, a car navigation system, a copy machine, a printer, a fax machine, a watch, a microwave oven, or the like.

REFERENCE SIGNS LIST 10 laminate
11 thermoplastic resin substrate
12 PVA-based resin layer

The invention claimed is:

1. A thin polarizing film, comprising a polyvinyl alcohol-based resin film that adsorbs and orients an iodine,
   wherein a polyvinyl alcohol-based resin that forms the polyvinyl alcohol-based resin film has a saponification degree of 99.0 mol % or more, and
   the thin polarizing film has a thickness of 10 μm or less, a single axis transmittance of 42.0% or more, a polarization degree of 99.95% or more, and the iodine content of 17.6 grams per 400×700 square millimeters or less, which is measured by an ion chromatography method.

2. A thin polarizing film, comprising a polyvinyl alcohol-based resin film that adsorbs and orients an iodine,
   Wherein the polyvinyl alcohol-based resin film is subjected to underwater stretching in an aqueous solution of boric acid, and
   the thin polarizing film has a thickness of 10 μm or less, a single axis transmittance of 42.0% or more, a polarization degree of 99.95% or more, and the iodine content of 17.6 grams per 400×700 square millimeters or less, which is measured by an ion chromatography method.

3. A thin polarizing film according to claim 1, wherein the thin polarizing film has a boric acid content of 1.5 grams per 400×700 square millimeters or less.

4. A method of producing a thin polarizing film as claimed in claim 1, comprising:
   forming a polyvinyl alcohol-based resin layer on a thermoplastic resin substrate to prepare a laminate;
   dyeing the polyvinyl alcohol-based resin layer with iodine; and
   subjecting the laminate to underwater stretching in an aqueous solution of boric acid.

5. A method of producing a thin polarizing film according to claim 4, wherein a maximum stretching ratio of the laminate is 5.0 times or more.

6. A method of producing a thin polarizing film according to claim 4, further comprising subjecting the laminate to in-air stretching at 95° C. or more before the dyeing and the boric acid underwater stretching.

* * * * *